United States Patent
Roth (10) Patent No.: US 10,045,486 B1
(45) Date of Patent: Aug. 14, 2018

(54) V-RAKE TEETH SUPPORT DEVICE AND RELATED SYSTEM

(71) Applicant: VRTS System, Inc., Wolback, NE (US)

(72) Inventor: Reginald Roth, Wolbach, NE (US)

(73) Assignee: VRTS System, Inc., Wolbach, NE (US)

( * ) Notice: Subject to any disclaimer, the term of this patent is extended or adjusted under 35 U.S.C. 154(b) by 170 days.

(21) Appl. No.: 14/027,797

(22) Filed: Sep. 16, 2013

Related U.S. Application Data (60) Provisional application No. 61/728,634, filed on Nov. 20, 2012.

(51) Int. Cl.
*A01D 80/00* (2006.01)
*A01D 80/02* (2006.01)

(52) U.S. Cl.
CPC ..................... *A01D 80/02* (2013.01)

(58) Field of Classification Search
CPC ...... A01D 80/02; A01D 78/144; A01D 84/00; A01D 78/001; A01D 80/00; A01D 34/661
USPC .......... 56/365–368, 375–378, 382, 383, 400, 56/DIG. 21
See application file for complete search history.

(56) References Cited

U.S. PATENT DOCUMENTS

| | | | | |
|---|---|---|---|---|
| 2,811,008 A | * | 10/1957 | Plant | 56/367 |
| 2,851,846 A | * | 9/1958 | Van Der Lely et al. | 56/377 |
| 2,867,073 A | * | 1/1959 | Van Der Lely et al. | 56/377 |
| 2,874,529 A | * | 2/1959 | Van Der Lely et al. | 56/400 |
| 2,908,129 A | * | 10/1959 | Van Der Lely et al. | 56/377 |
| 2,909,888 A | * | 10/1959 | Van Der Lely et al. | 56/377 |
| 2,932,148 A | * | 4/1960 | Van Der Lely et al. | 56/377 |
| 3,006,134 A | * | 10/1961 | Van Der Lely et al. | 56/377 |
| 3,515,145 A | * | 6/1970 | Herbsthofer | 460/110 |
| 3,992,862 A | * | 11/1976 | van der Lely | A01D 80/02 56/370 |
| 4,538,404 A | * | 9/1985 | Heimark, Jr. | A01D 45/021 56/119 |
| 2003/0154705 A1 | * | 8/2003 | Sugden et al. | 56/320.1 |
| 2009/0178382 A1 | * | 7/2009 | Sugio et al. | 56/320.2 |
| 2013/0104514 A1 | * | 5/2013 | Bentzinger | 56/400 |

* cited by examiner

*Primary Examiner* — Thomas B Will
*Assistant Examiner* — Mai T Nguyen
(74) *Attorney, Agent, or Firm* — Suiter Swantz pc llo (57) ABSTRACT

A device and related system is disclosed for detachably mounting to the teeth of a wheel rake to support each individual tooth preventing premature tooth breakage. The device and system for mitigating stress on an individual wheel rake tooth includes a plurality of individual supports detachably mounted to two or more wheel rake teeth. The individual supports are detachably coupled to two adjacent individual supports via elongated openings at each end of the individual support. When detachably mounted to the wheel rake teeth at a radius inside the tip of the teeth, the supports act to distribute the stress on an individual wheel rake tooth among adjacent wheel rake teeth as the tooth impacts an object.

20 Claims, 9 Drawing Sheets

V-RAKE TEETH SUPPORT DEVICE AND RELATED SYSTEM

RELATED APPLICATIONS

The present invention claims priority to U.S. Provisional Application No. 61/728,634 filed 20 Nov. 2012 entitled V-RAKE TOOTH STIFFENER DEVICE AND RELATED SYSTEM by Reginald Roth.

FIELD OF THE INVENTION

The present invention relates generally to agriculture field equipment and operational preservation thereof. More particularly, embodiments of the present invention relate to a device mounted to the teeth of a wheel rake to mitigate individual tooth stress and make more efficient the overall raking device.

BACKGROUND OF THE INVENTION

Teeth mounted on a wheel type rake device may have a specific life span before breakage may occur due to the repetitive stress placed on the teeth. Should one tooth break the cost of replacing the tooth and the reduction in performance may be two of the factors influencing a replacement decision. However, as teeth are hub-mounted to the wheel rake, the time and labor involved with changing a single tooth may be a determining factor in the replacement decision of a broken wheel rake tooth.

As production methods evolve, operators may desire to harvest a greater variety of product from a field. Cornstalks may be one valuable resource for an operator to harvest. After a combine may harvest a field, stalk material may remain strewn about the field. One first step in harvesting stalk material may include raking the stalk material into a windrow for follow on recovery by a round baling machine.

A V-rake device may be designed for operation on a relatively level field. Some harvested crops may result in a field including uneven rows. As an operator may use the V-rake device in a field of harvested corn, the uneven rows of corn stubble remaining after the corn stalks are cut during harvest may adversely affect the individual teeth of the rake. These uneven rows may not only include cut corn stalks, but also may include a slight linear ridge of earth created by a planting device. Occasionally, this slight linear ridge of earth may be exaggerated in size which may contribute to the stress on an individual tooth as the tooth impacts the ridge.

Stalk material may be of mass greater than material for which a wheel rake tooth may be designed. Wet alfalfa hay may be one material for which a wheel rake tooth is designed. As the operator rakes stalk material, the greater mass of the stalk material may stress wheel rake teeth to a greater degree than would the mass of the wet hay material for which the tooth was designed.

An operator may rake heavy stalk material with a rake and tooth designed for material of lesser weight. This activity may increase the frequency of which rake teeth are broken. As each tooth impacts the heavy or light material, the tooth is individually stressed in a plurality of directions including tension, vibration, compression, and torsion. These repetitive stresses directly decrease the life span of individual rake teeth.

Individual tooth vibration may be a causal factor in premature breakage of the tooth. As an individual tooth may impact an object (e.g., a rock, hardened ground, and frozen earth) an abrupt return to normal shape after an elastic flexure may result in significant vibration of the tooth. Repetitive vibration may cause wear to the tooth near the guide ring and result in premature breakage of the tooth.

Therefore, a need remains for a system and device to economically support each individual rake tooth preventing frequent breakage, increasing productivity, and enabling operator use of current rake devices.

SUMMARY

Accordingly, an embodiment of the present invention is directed to a device for mitigating stress on an individual wheel rake tooth, comprising a plurality of individual supports detachably mounted to a plurality of wheel rake teeth, each individual support mounted via at least two mounting openings corresponding to at least two of the wheel rake teeth, each individual support detachably coupled to two adjacent individual supports via a first elongated coupler opening at a first end of the individual support and a second elongated coupler opening at a second end of the individual support, the first end and the second end being opposite, wherein the plurality of individual supports, when detachably mounted to the plurality of wheel rake teeth and coupled to adjacent individual supports, encircle a hub of a wheel rake at a specific radius of the hub.

An additional embodiment of the present invention is directed to a system for system for mitigating stress on an individual wheel rake tooth, comprising a plurality of individual supports detachably mounted to a plurality of wheel rake teeth, each individual support mounted via at least two mounting openings corresponding to at least two of the wheel rake teeth, each individual support detachably coupled to adjacent individual supports via a first elongated coupler opening at a first end and a second elongated coupler opening at a second end, the elongated coupler openings, wherein the plurality of individual supports, when detachably mounted to the plurality of wheel rake teeth, encircle a hub of a wheel rake at a specific radius of the hub.

An additional embodiment of the present invention is directed to a supporting means for detachably mounting to a portion of plurality of wheel rake teeth, coupling to two adjacent supporting means, supporting the plurality of wheel rake teeth, encircling a hub of a wheel rake at a specific radius of the hub, and distributing a stress on an individual wheel rake tooth among at least two adjacent individual wheel rake teeth.

An additional embodiment of the present invention is directed to a device for mitigating stress on an individual wheel rake tooth wherein each of the elongated coupler openings are loosely coupled for flexibility and each of the plurality of individual supports is constructed of one of: flexible material and rigid material.

An additional embodiment of the present invention is directed to a device for mitigating stress on an individual wheel rake tooth wherein the specific radius at which the device is detachably mounted to the plurality of wheel rake teeth is larger than a radius formed by a wheel rake guide ring.

An additional embodiment of the present invention is directed to a device for mitigating stress on an individual wheel rake tooth wherein each of the plurality of individual supports further comprises a first clamp support configured for oppositely mounting on wheel rake teeth with a second clamp support, the first and second clamp supports overlappingly clamp around the individual wheel rake teeth and secure the first and second clamp supports to the individual wheel rake teeth, the first and second clamp supports, when mounted, enclose around at least two of the individual wheel rake teeth and overlap so that elongated coupler openings on each of the first and second clamp supports align.

An additional embodiment of the present invention is directed to a device for mitigating stress on an individual wheel rake tooth wherein each of the elongated coupler openings include four mounting openings aligned to mount with four individual wheel rake teeth, a radial distance between the first elongated coupler opening and the second elongated coupler opening is equal to an arc of approximately 36 degrees and each of the elongated coupler openings alternatively include two mounting openings aligned to mount with two individual wheel rake teeth, a radial distance between the first elongated coupler opening and the second elongated coupler opening is equal to an arc of approximately 18 degrees.

BRIEF DESCRIPTION OF THE DRAWINGS

The numerous advantages of the present invention may be better understood by those skilled in the art by reference to the accompanying figures in which.

DESCRIPTION

Figure 1:
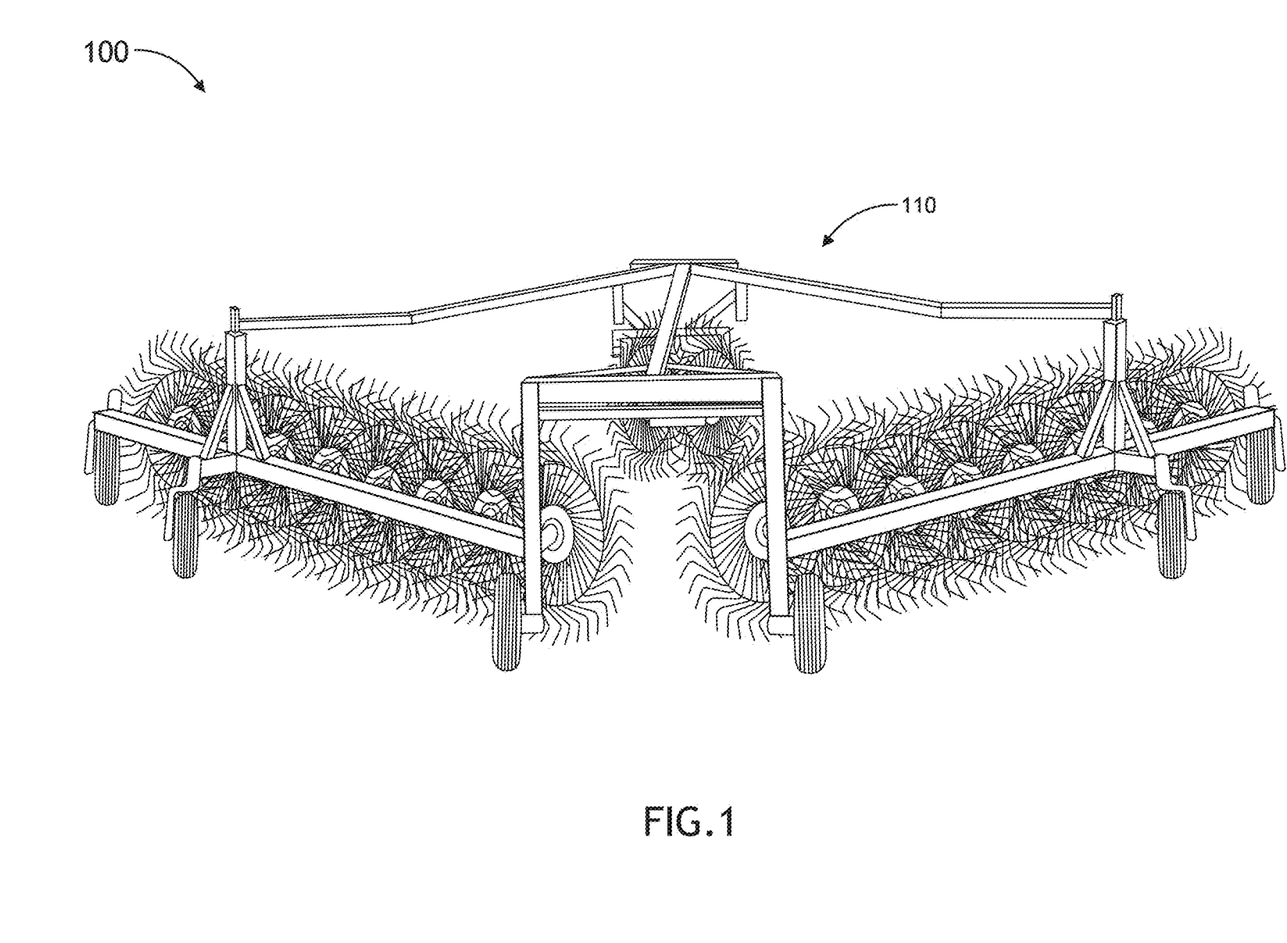
FIG. 1 is a diagram of V-rake to which embodiments of the current invention may be mounted.

Referring to FIG. 1, a diagram of V-rake to which embodiments of the current invention may be mounted is shown. A standard configuration may include a V-rake device 110 including 18 wheels, of which 16 wheels form the rake and 2 wheels spread material driven over by a pulling vehicle. Each wheel may be comprised of a hub to which the teeth are detachably mounted, a round plate for minimizing blow through of raked material, a guide ring for positioning each tooth at a constant interval, and a plurality of teeth for raking desired material.

Embodiments of the present invention may detachably mount to the teeth of a wheel rake device and function to alter and mitigate the stress on each individual tooth as the tooth engages the ground. One embodiment of the present invention may detachably mount to four teeth of a wheel type V-rake device.

It is contemplated herein; embodiments of the present invention may also be configured to mount to teeth of additional implements designed for moving residual stubble. A wheeled rake device of a single angular design for side delivery and a rake device of a multi angle design are examples of devices for which embodiments of the present invention may be configured. Further, teeth of a linear rake design may function with embodiments of the present invention mounted to distribute stress on each individual tooth.

Figure 2A:
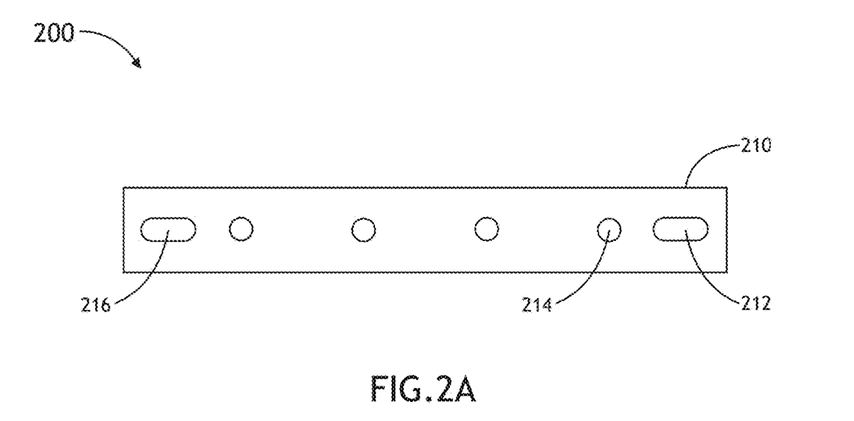
FIG. 2A is a side view of a preferred embodiment of the present invention showing elongated coupling openings and a four-hole design.

Referring to FIG. 2A, a side view of a preferred embodiment of the present invention showing elongated coupling openings and a four-hole design is shown. Each individual support 210 may slidably mount to an exemplary four teeth of a wheel type rake device via mounting openings 214. For a wheel comprised of 40 teeth, ten individual supports 210 or 48 teeth, twelve individual supports 210, may be coupled together to mount to the teeth and encircle the hub of the wheel rake.

Each individual support 210 may further include elongated coupler openings on each of a first end 212 and a second end 216. These elongated coupler openings 212, 216 allow the individual supports to be flexibly coupled to another of an individual support 210. As the wheel rake operates, the flexible coupling between each of the individual supports 210 allows for movement of the individual supports 210 relative to each other adding to absorption of the stress on the few teeth in contact with the ground.

Figure 2B:
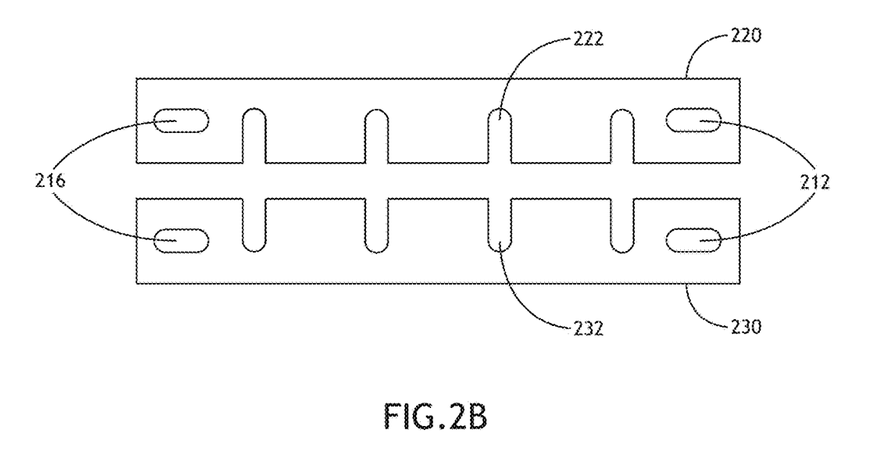
FIG. 2B is a side view of an alternate embodiment of the present invention showing elongated mounting openings and a four hole design in two slotted pieces.
Figure 2C:
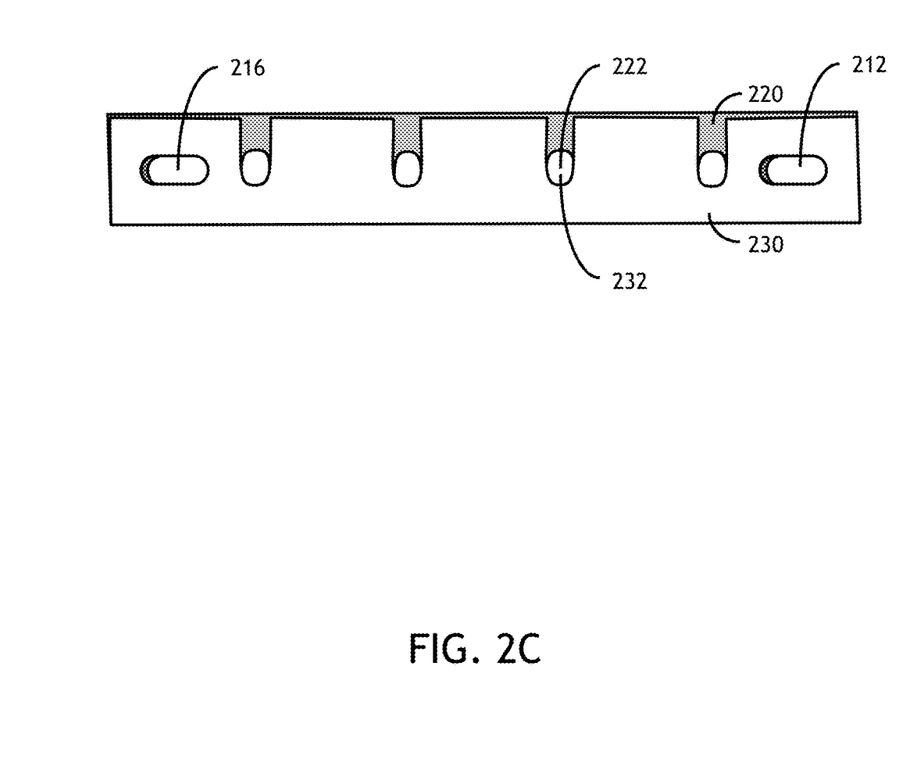
FIG. 2C is another view of an alternative embodiment of the present invention showing a four-tooth configuration where each clamp support may overlappingly clamp around individual teeth of a wheel.

Referring to FIG. 2B, a side view of an alternate embodiment of the present invention showing elongated mounting openings and a four hole design in two slotted pieces is shown. This alternate embodiment may comprise a first clamp support 220 configured for oppositely mounting with a second clamp support 230. Such a dual support configuration may allow for ease of mounting to the teeth. Referring to FIG. 2C, in a four-tooth configuration, each clamp support 220, 230 may overlappingly clamp around the individual teeth of the wheel. When mounted and secured to the teeth as shown in FIG. 2C, this alternate embodiment may sufficiently overlap that, when mounted, the four slotted openings 222, 232 enclose around four teeth and the elongated coupler openings 212, 216 align. Bolts or other fasteners such as rivets, shear bolts and the like may then be inserted into the elongated coupler openings to couple each clamp support 220, 230 to another clamp support 220, 230.

A preferred embodiment of the present invention may comprise a plurality of individual supports, detachably coupled to each other at each end, and forming a circular configuration around a hub of the wheel, while slidably mounted to the teeth of the wheel.

Figure 3:
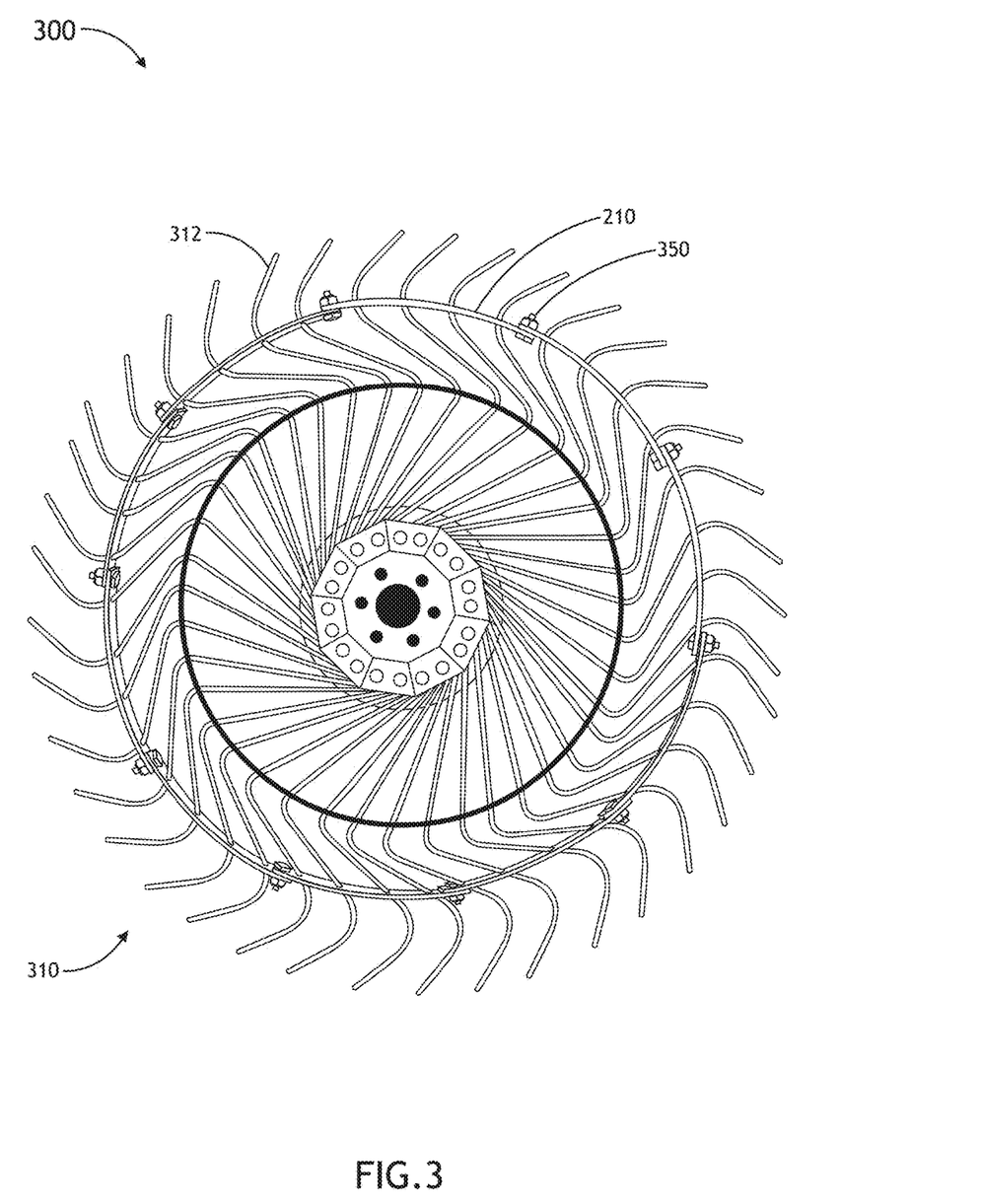
FIG. 3 is a front view of a wheel rake device with an embodiment of the present mounted.

Referring to FIG. 3, a front view of a wheel rake device with an embodiment of the present mounted is shown. Each individual support 210 of the present invention may be slidably mounted to the teeth 312 of the wheel 310 while detachably coupled to each adjacent individual support 210 forming a circle around the hub of the wheel. The exemplary embodiment shown comprises ten or twelve individual supports 210 detachably coupled with bolts 350. Each individual support 210 may possess a slight curvature in an arc equal to one-tenth of 360 degrees. For example, each individual support 210 may span a total of 36 degrees from center to center of the elongated coupler openings 212, 216 at each end. This span of each individual support may allow for ten or twelve individual supports to cover a circle while overlapping at each end.

An exemplary ten or twelve individual supports is offered as a non-limiting example of a preferred embodiment of the present invention. It is contemplated herein; a greater or lesser number of individual supports 210 may function within the scope of the present invention. Further, embodiments of the present invention may function providing support to a wheel comprised of any number of teeth. Non-limiting examples of wheels with 48 teeth used herein are by way of example and are used only for exemplary purposes. In addition, function of embodiments of the present invention is independent of wheel size. One embodiment of the present invention may best function on a wheel of 55 inches in diameter while another embodiment may function on a plurality of additional wheel sizes including, but not limited to, wheel diameters of 60 inches and 62 inches.

As the individual supports 210 are mounted to the teeth 312, each individual support 210 is configured to overlap with the adjacent individual support 210. Bolts 350 or other comparable fastener devices may be employed to secure each individual support 210 to the other through the elongated mounting openings 212. 216. Preferably, each bolt 350 may be comprised of well-known partial thread configuration allowing for tightening of a nut to a designed torque where the nut remains secure but at a distance slightly greater than a thickness of the two overlapping individual supports plus two washers if washers are desired. This mounting configuration may allow each of the individual supports to remain flexibly coupled while flexibly mounted to the teeth 312.

It is further contemplated additional sizes of individual supports 210 may function within the scope of the present invention. Ease of mounting an individual support 210 to a set of teeth 312 (4 teeth, 2 teeth, etc.) balanced with manufacturing costs, functional tests, and usage costs may be some factors influencing the length of each individual support 210. In addition, variable sizes of elongated coupler openings 216, and various sizes of mounting openings 124 may function within the scope of the present invention.

This stress mitigation flex is significant in operation. Preferably, a flexible mount of the individual supports is desired to mitigate individual tooth 312 stress and aid in tooth 312 longevity. As each tooth 312 impacts an obstacle (e.g., the ground, rock, frozen dirt, etc.), the flexible nature of the mounted individual supports 210 may allow a wider group of teeth 312 to flex and absorb the stress of the few teeth 312 engaged with the ground.

Additionally, a rigid mounting of the individual supports 210 is also contemplated herein. Alternate embodiments of the present invention may function with a rigid mounting configuration. In such rigid mounting configuration, the fasteners or bolts 350 may be securely tightened to prevent flex between individual supports.

Implementation of embodiments of the present invention may allow an operator of a wheel rake device fitted with individual supports 210 additional functions. For example, a wheel rake device operated with a mounted V-Rake teeth support may apply a greater downward pressure (DP) enabling a greater raking force applied to the field of choice.

Moreover, with embodiments of the present invention mounted, a wheel rake may function more efficiently than an unimproved rake. For example, in specific terrain such as a steep side hill, a wheel rake fitted with embodiments herein may effectively gather stalk material previously inaccessible by unimproved implements.

Figure 4:
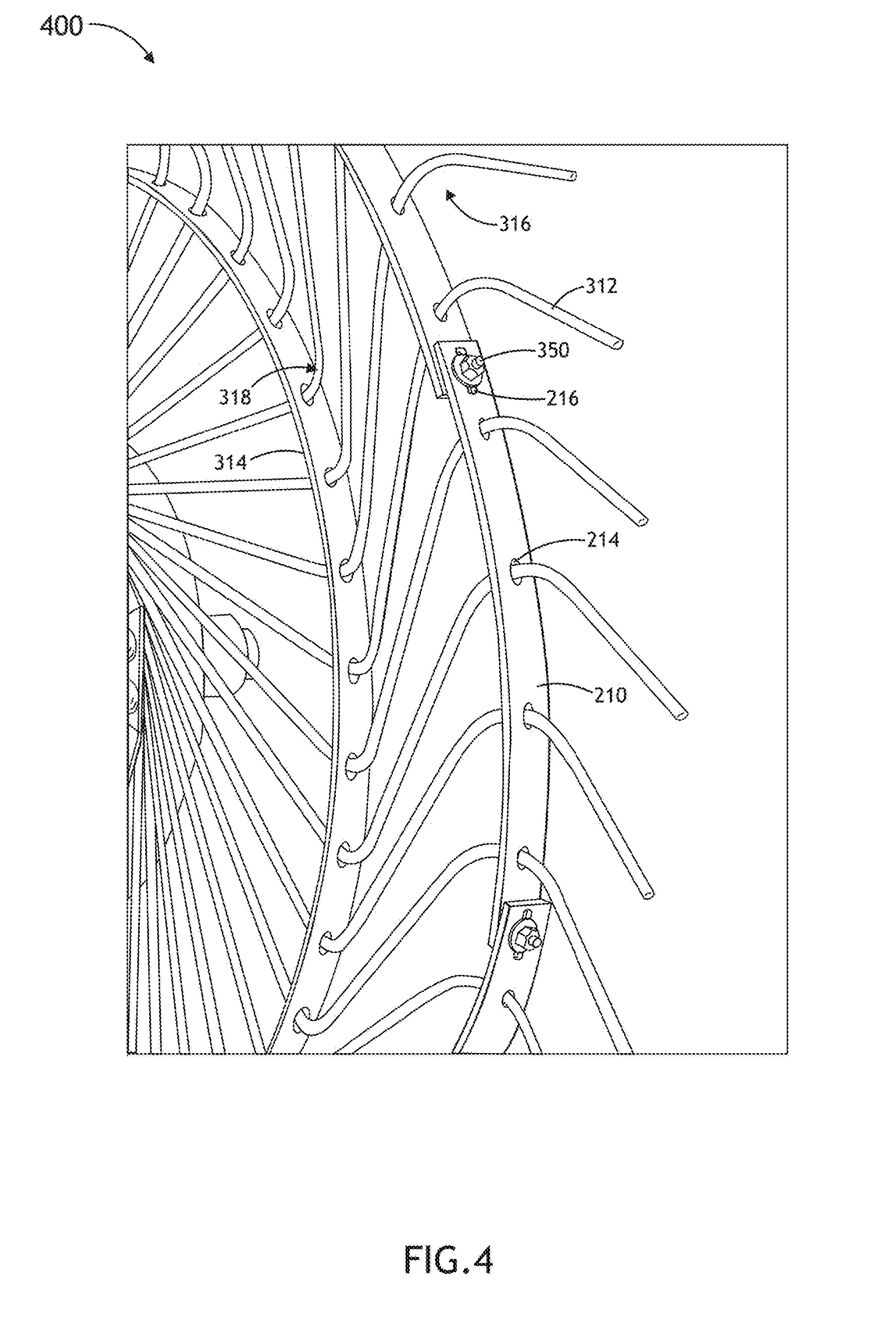
FIG. 4 is an perspective view of an embodiment of the present invention mounted on the teeth of a wheel rake.

Referring to FIG. 4, a perspective view of an embodiment of the present invention mounted on the teeth of a wheel rake is shown. The elongated coupler opening 216 may be seen extending from either side of a washer associated with the fastener or bolt 350 used to aid in detachably coupling the individual supports 210 together. This amount of flex for each individual support 210 individual support 210 may be adjustable during a manufacturing process as well as after manufacture by increasing the length of each of the elongated coupler opening 216.

Generally, a V-rake tooth 312 may be attached to the hub of the wheel. Each tooth 312 extends from the hub through a wheel rake guide ring 314 for positioning each tooth at a consistent interval around the wheel. As each tooth 312 extends from the wheel rake guide ring 314, it may make a first bend 318 of approximately 90 degrees. As each tooth 312 extends further from the hub, a second bend 316 of approximately 90 degrees may be desired. Preferably, the radius of mounting the present invention may be at a radius as measured from the center of the wheel where each tooth makes the second bend 316.

It is contemplated additional radii of mounting may function in accordance with embodiments of the present invention. Based on significance of stress mitigation, an alternate mounting radius may benefit tooth preservation in a like manner.

As an individual tooth 312 of a wheel 310 rake engages the ground, the stress on the tooth may be part flexure and part sheer stress from torsion. Each standard tooth may be manufactured with the first bend 318 and the second bend 316 to increase tooth length and increase tooth flexibility and overall life. With wear and use, a V-rake tooth may normally break in proximity with the first bend 318 and in the vicinity of the wheel rake guide ring 314.

Embodiments of the present invention may enable stress distribution among each tooth in proximity with the tooth under great stress. For example, a single tooth 312 may impact a rock and begin to flex. With the present invention mounted on the wheel rake, the individual support 210 associated with the tooth under great stress will distribute the stress to the teeth adjacent to the stressed tooth. Therefore, the potential of the stressed tooth breaking is minimized by this stress distribution.

Figure 5:
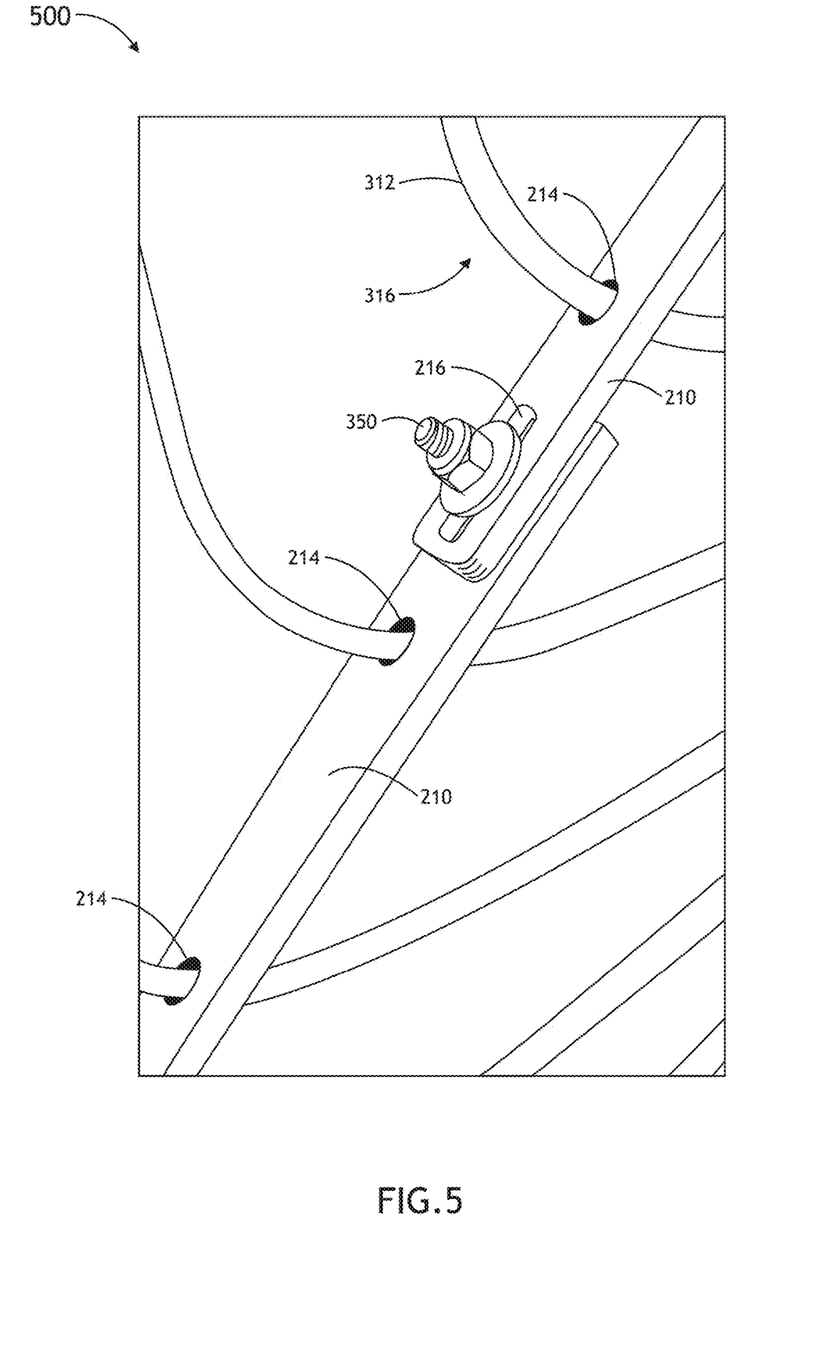
FIG. 5 is a close up perspective view of an embodiment of the present invention mounted on the teeth of a wheel rake.

Referring to FIG. 5, a close up perspective view of an embodiment of the present invention mounted on the teeth of a wheel rake is shown. Each mounting opening 214 may be sized to accurately mount to each tooth, yet offer an amount of flexibility so a tooth may slightly flex without impacting the side of the mounting opening 214. For example, a tooth may be 0.350 inches in diameter while a preferable tooth mounting opening may be constructed at a slightly larger diameter. This greater diameter allows a tooth 312 to operate normally under normal loads. At greater loads, when a tooth may impact a rock or other obstacle, the flex of the tooth may be such that it does impact the inside of the mounting opening 214. This impact in turn creates movement of the individual support 210, a flex of each surrounding tooth, and mitigation of the individual tooth stress by distributing the individual tooth stress among those teeth in proximity.

Figure 6:
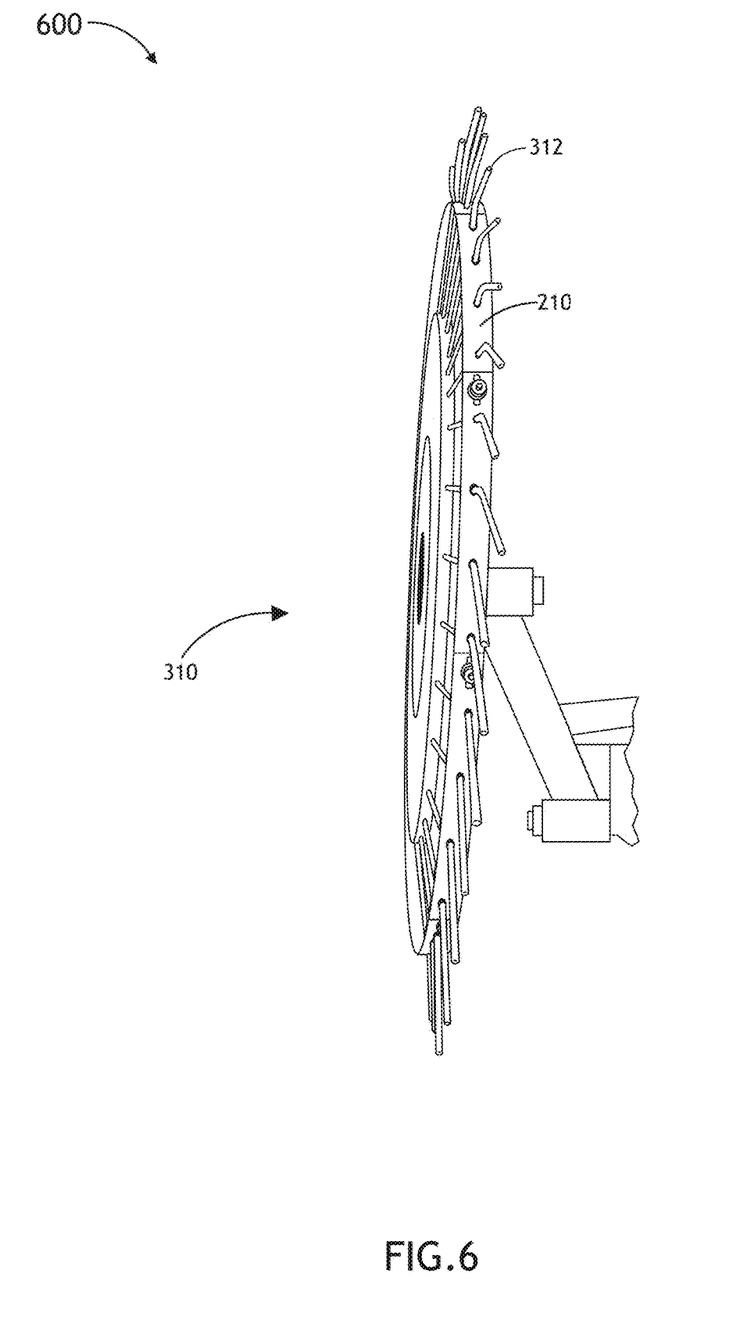
FIG. 6 is a side view of a wheel rake device with an embodiment of the present mounted.

Referring to FIG. 6, a side view of a wheel rake device with an embodiment of the present mounted is shown. Each individual support 210 of the present invention may be seen detachably coupled to the teeth 312 of the wheel 310 rake.

Figure 7:
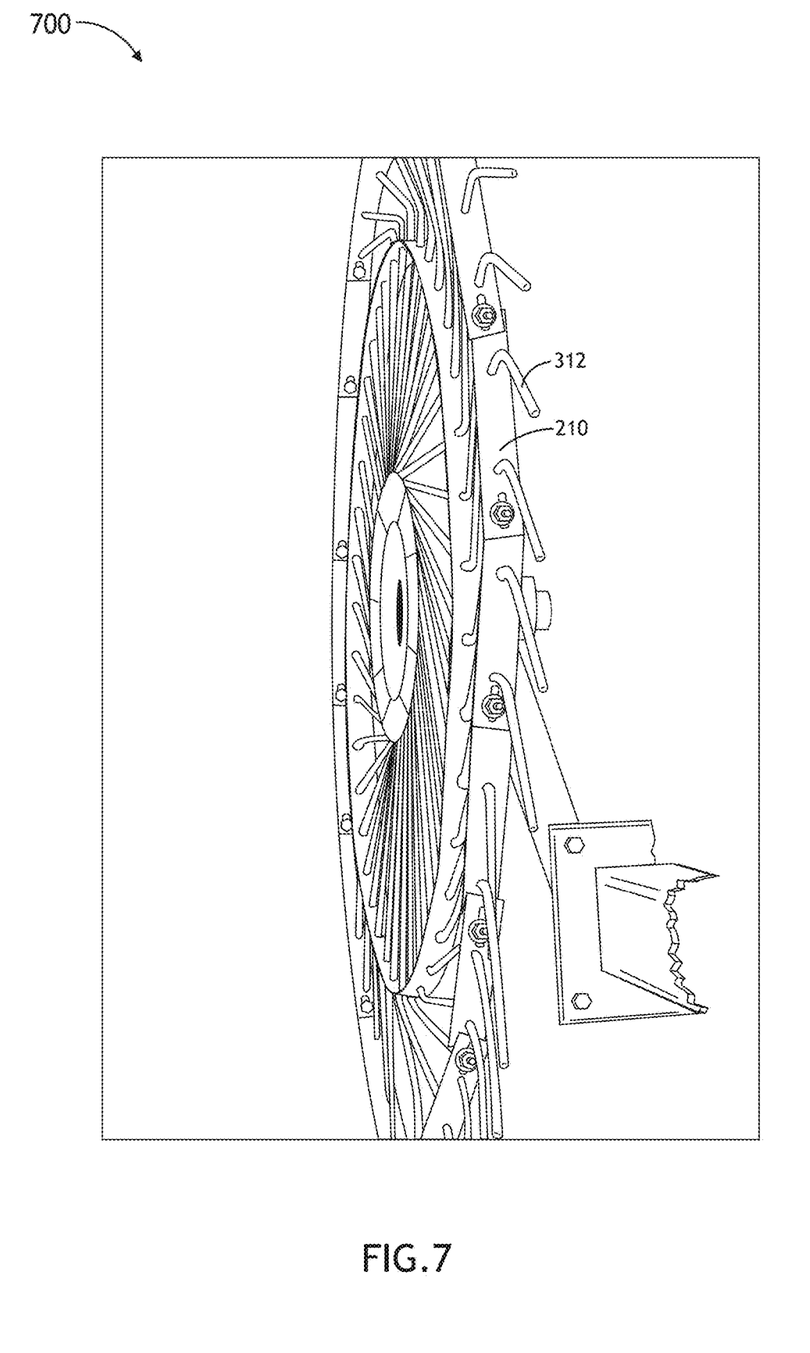
FIG. 7 is a perspective view of a wheel rake device with an embodiment of the present mounted.

Referring to FIG. 7, a perspective view of a wheel rake device with an embodiment of the present mounted is shown. Alternative sizes and alternative materials may be employed as individual supports 210 of the present invention. Here, an exemplary individual support 210 of two mounting openings with each individual support 210 having elongated coupler openings 212, 216 on each end. It is further contemplated herein; individual supports 210 may be manufactured from a variety of material suitable for use in a stress distribution environment.

Each individual support 210 and clamp support 220, 230 may be a preformed, single-piece, substantially rectangular member, each constructed from a material known to have a suitable strength for the intended use of the support device, such as, but not limited to, high strength plastics (e.g., polyurethane, polyvinyl chloride, and variable density polyethylene), metallic materials (e.g., brushed steel and aluminum), etc. Further, more flexible material such as, but not limited to, rubber or other flexible material and the like may function within the scope of the present invention.

It is further contemplated an alternative embodiment of the present invention may include the support device constructed from a single piece of material, suitably flexible to allow mounting on the teeth of the wheel rake device and detachably coupled together at opposite overlapping ends. Further, embodiments herein may include a flexible device of one piece circular design able to flexibly mount without coupling required.

Figure 8:
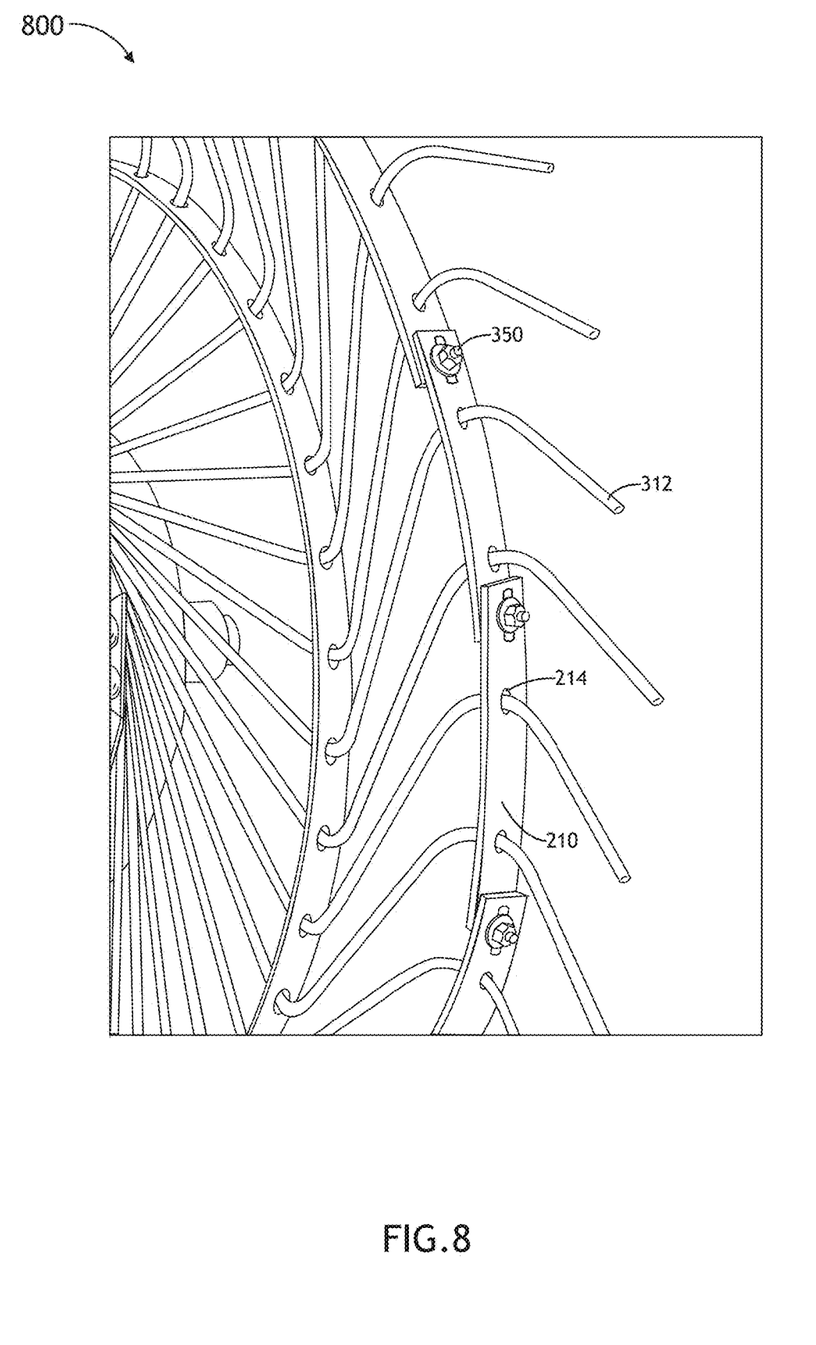
FIG. 8 is a perspective view of a wheel rake device with an alternate embodiment of the present mounted.

Referring to FIG. 8, a perspective view of a wheel rake device with an alternate embodiment of the present mounted is shown. Each individual support 210 may be constructed of variable sizes not limited to a uniform size throughout. For example, a circle of coupled individual supports 210 may function with two tooth opening individual supports mounted in combination with four tooth opening individual supports. A balance of mounting ease, function, and cost may factor in to a preferable size decision.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A device for mitigating stress on an individual wheel rake tooth, comprising:
  a plurality of individual supports detachably mounted to a plurality of wheel rake teeth, an individual support of the plurality of individual supports comprising:
   at least two mounting openings; and
   at least two elongated coupler openings,
    a mounting opening of the at least two mounting openings having a diameter larger than a diameter of a tooth of the plurality of wheel rake teeth for slidable mounting to the tooth of the plurality of wheel rake teeth,
    a first elongated coupler opening of the at least two elongated coupler openings configured to be detachably coupled to a first adjacent individual support via the first elongated coupler opening at a first end of the individual support,
    a second elongated coupler opening of the at least two elongated coupler openings configured to be detachably coupled to a second adjacent individual support at a second end of the individual support via the second elongated coupler opening,
   wherein the plurality of individual supports, when detachably mounted to the plurality of wheel rake teeth and coupled to adjacent individual supports via the at least two elongated coupler openings, encircle a hub of a wheel rake at a first radius that is larger than a second radius, the second radius coinciding with a guide ring of the wheel rake.

2. The device of claim 1, wherein the at least two elongated coupler openings are loosely coupled for flexibility.

3. The device of claim 2, wherein the at least two elongated coupler openings are loosely coupled for a predetermined amount of flexibility in at least one direction, wherein the predetermined amount of flexibility is a sliding flexibility based on a dimension of the first elongated coupler opening, a dimension of the second elongated coupler opening, or a dimension of a respective elongated coupler opening of a respective adjacent individual support.

4. The device of claim 1, wherein the individual support of the plurality of individual supports further comprises:
  a first clamp support configured for oppositely mounting with a second clamp support to: (i) overlappingly clamp around at least two wheel rake teeth of the plurality of wheel rake teeth, and (ii) slidingly secure the first and second clamp supports to the at least two wheel rake teeth, wherein the plurality of individual supports including the first and second clamp supports, when detachably mounted, (a) enclose around the at least two wheel rake teeth, and (b) align first and second elongated coupler openings of the first clamp support respectively with first and second elongated coupler openings of the second clamp support.

5. The device of claim 1, wherein the individual support of the plurality of individual supports includes four mounting openings aligned to mount with four individual wheel rake teeth of the plurality of wheel rake teeth, and wherein a radial distance between the first elongated coupler opening and the second elongated coupler opening is equal to an arc of approximately 36 degrees.

6. The device of claim 1, wherein the individual support of the plurality of individual supports includes two mounting openings aligned to mount with two individual wheel rake teeth of the plurality of wheel rake teeth, and wherein a radial distance between the first elongated coupler opening and the second elongated coupler opening is equal to an arc of approximately 18 degrees.

7. The device of claim 1, wherein the individual support of the plurality of individual supports is constructed of rigid material.

8. A system for mitigating stress on an individual wheel rake tooth, comprising:
  a plurality of fasteners;
  a plurality of individual supports detachably mounted to a plurality of wheel rake teeth, an individual support of the plurality of individual supports mounted via at least two mounting openings corresponding to at least two wheel rake teeth of the plurality of wheel rake teeth, the individual support of the plurality of individual supports detachably coupled to adjacent individual supports via a first elongated coupler opening at a first end of the individual support, a second elongated coupler opening at a second end of the individual support, and the plurality of fasteners, the plurality of fastener configured for removal and replacement of an individual support of the plurality of individual supports and further configured to provide a sliding connection between the individual support and the adjacent individual supports of the plurality of individual supports;

wherein the plurality of individual supports, when detachably mounted to the plurality of wheel rake teeth, encircle a hub of a wheel rake at a first radius that is larger than a second radius, the second radius coinciding with a guide ring of the wheel rake.

9. The system of claim 8, wherein the first elongated coupler opening and the second elongated coupler opening are loosely coupled by at least two fasteners of the plurality of fasteners for flexibility.

10. The system of claim 8, wherein the first elongated coupler opening and the second elongated coupler opening are loosely coupled for a predetermined amount of flexibility, the predetermined amount of flexibility being based on a dimension of: the first elongated coupler opening, the second elongated coupler opening, or an elongated coupler opening of an adjacent individual support.

11. The system of claim 8, wherein the individual support of the plurality of individual supports further comprises:
a first clamp support configured for oppositely mounting with a second clamp support to: (i) overlappingly clamp around at least two wheel rake teeth of the plurality of wheel rake teeth, and (ii) slidingly secure the first and second clamp supports to the at least two wheel rake teeth, wherein the plurality of individual supports including the first and second clamp supports, when detachably mounted, (a) enclose around the at least two wheel rake teeth, and (b) align first and second elongated coupler openings of the first clamp support respectively with first and second elongated coupler openings of the second clamp support.

12. The system of claim 8, wherein the individual support of the plurality of individual supports further comprises:
four mounting openings aligned to mount with four individual wheel rake teeth of the plurality of wheel rake teeth, wherein a radial distance between the first elongated coupler opening and the second elongated coupler opening is equal to an arc of approximately 36 degrees.

13. The system of claim 8, wherein the individual support of the plurality of individual supports further comprises:
two mounting openings aligned to mount with two individual wheel rake teeth of the plurality of wheel rake teeth, wherein a radial distance between the first elongated coupler opening and the second elongated coupler opening is equal to an arc of approximately 18 degrees.

14. The system of claim 8, wherein the individual support of the plurality of individual supports is constructed of rigid material.

15. A system for mitigating stress on an individual wheel rake tooth, comprising:
a plurality of supports, an individual support of the plurality of supports comprising mounting openings to slidingly and detachably mount to a portion of a plurality of wheel rake teeth and support one or more teeth of the portion of the plurality of wheel rake teeth when the one or more teeth receive a force, the individual support further comprising an elongated coupler opening at each of opposite ends of the individual support for detachably coupling an adjacent support of the plurality of supports;
a fastener for sliding and removable coupling of the adjacent support at an end of the opposite ends of the individual support, wherein the plurality of supports is configured to encircle a hub of a wheel rake at a first radius that is larger than a second radius, the second radius coinciding with a guide ring of the wheel rake.

16. The system of claim 15, wherein the elongated coupler openings have a predetermined dimension, and wherein two or more adjacent supports are removably attached to the individual support via the elongated coupler openings and at least two fasteners, enabling an amount of sliding that is proportional to the predetermined dimension.

17. The system of claim 15, wherein the plurality of wheel rake teeth have two or more bends, wherein the first radius at which the plurality of supports encircle the hub of the wheel rake coincides with an outermost bend of the two or more bends.

18. The system of claim 15, wherein the individual support of the plurality of supports further comprises:
a first clamp support for oppositely mounting with a second clamp support, the first and second clamp supports configured for at least one of (i) overlappingly clamping around the portion of wheel rake teeth of the plurality of wheel rake teeth, (ii) slidingly securing the first and second clamp supports to the portion of wheel rake teeth, the portion of wheel rake teeth comprising at least two wheel rake teeth, (iii) enclosing around the at least two wheel rake teeth, and (iv) aligning an elongated coupler opening of the first clamp support with an elongated coupler opening of the second clamp support.

19. The system of claim 15, wherein the individual support of the plurality of supports is equal to an arc of approximately one of: 36 degrees and 18 degrees.

20. The system of claim 15, wherein each of the plurality of supports is identically shaped and is one of: flexible and rigid.

* * * * *